(12) United States Patent
Budd

(10) Patent No.: US 7,189,668 B2
(45) Date of Patent: Mar. 13, 2007

(54) BARIUM LANTHANUM SILICATE GLASS-CERAMICS

(75) Inventor: Michael Budd, Porsgrunn (NO)

(73) Assignee: Norsk Hydro ASA, Oslo (NO)

( * ) Notice: Subject to any disclaimer, the term of this patent is extended or adjusted under 35 U.S.C. 154(b) by 0 days.

(21) Appl. No.: 11/008,151

(22) Filed: Dec. 10, 2004

(65) Prior Publication Data

US 2005/0130823 A1  Jun. 16, 2005

Related U.S. Application Data

(62) Division of application No. 10/362,168, filed as application No. PCT/NO01/00323 on Jul. 27, 2001, now abandoned.

(30) Foreign Application Priority Data

Aug. 23, 2000  (NO) .................................. 20004233

(51) Int. Cl.
*C03C 8/24* (2006.01)
*C03C 10/06* (2006.01)
(52) U.S. Cl. .............................. 501/5; 501/14; 501/15; 65/33.1; 65/33.5; 65/33.6
(58) Field of Classification Search .................. 501/5, 501/10, 15–21, 14; 65/33.1, 33.5, 33.6
See application file for complete search history.

(56) References Cited

U.S. PATENT DOCUMENTS

| 3,467,534 A | 9/1969 | MacDowell |
| 4,566,987 A | 1/1986 | Gliemeroth et al. |
| 4,965,229 A | 10/1990 | Nishino et al. |
| 6,475,938 B1 | 11/2002 | Budd |
| 6,623,845 B1 | 9/2003 | Katsumura et al. |

FOREIGN PATENT DOCUMENTS

| EP | 1130003 | 9/2001 |
| JP | 59-39783 | * 3/1984 |

(Continued)

OTHER PUBLICATIONS

*Engineered Materials Handbook*, vol. 4, "Ceramics and Glasses", ASM International 1991, p. 22.

(Continued)

Primary Examiner—Karl Group
(74) Attorney, Agent, or Firm—Wenderoth, Lind & Ponack, L.L.P.

(57) ABSTRACT

This invention relates to glass-ceramic materials in the $BaO$—$La_2O_3$—$SiO_2$ system, which are suitable for processing via a powder route, and which, after heat-treatment have a combination of high thermal expansion and excellent refractoriness. The precursor glass powders of the present invention have compositions on a weight percent basis of 10–55% $BaO$, 3–50% $La_2O_3$, 25–48% $SiO_2$ and optionally up to 30% in total of other compatible metal oxides. The powders are substantially free from alkali metal oxides and from boron oxide such that the refractoriness of the glass-ceramic materials is not compromised. The materials may be advantageously employed at high temperatures in direct combination with other materials of high expansion or may be used to join or hermetically seal components made of other materials having similarly high expansion.

2 Claims, 2 Drawing Sheets

Figure 1. showing close match in expansion between glass-ceramic support, glass-ceramic sealant and lanthanum nickelate ceramic

FOREIGN PATENT DOCUMENTS

| | | |
|---|---|---|
| JP | 10-106880 | 4/1998 |
| JP | 11-60266 | 4/1998 |
| JP | 11-060266 | 6/1999 |
| JP | 11-265837 | 9/1999 |
| WO | 9846540 | 10/1998 |

OTHER PUBLICATIONS

W.D. Kingery, H.K. Bowen & D.R. Uhlmann, *Introduction to Ceramics*, 2nd Edition, John Wiley & Sons, 1976, p. 368.

H.G. Pfaender, *Schott Guide to Glass*, Chapman & Hall 1996, p. 184.

R.H. Doremus, *Glass Science*, 2nd Edition, John Wiley & Sons 1994, p. 74.

*Glasses and Glass-ceramics*, Ed. M. H. Lewis, Chapman & Hall 1989.

W. Höland & G. Beall, *Glass-ceramic Technology*, The American Ceramic Society 2002.

J. Hlaváč, *The Technology of Glass and Ceramics- An Introduction*, Glass Science and Technology 4, Elsevier 1983, Chapter III Glass-Ceramics.

A. Goldsmith, T.E. Waterman & H.J. Hirschhorn, *Handbook of Thermophysical Properties of Solid Materials*, Revised Edition, vol. III: Ceramics. MacMillan, New York 1961, Figure VII-A-1-a.

* cited by examiner

BARIUM LANTHANUM SILICATE GLASS-CERAMICS

This is a Divisional Application of U.S. application Ser. No. 10/362,168, filed May 30, 2003 now abandonded, which is a 371 of PCT/NO01/00323, filed Jul. 27, 2001.

The present invention relates to glass-ceramic materials in the BaO—La$_2$O$_3$—SiO$_2$ system possessing a coefficient of thermal expansion in excess of $10 \times 10^{-6 \circ}$ C.$^{-1}$ (20–1000° C.) and dilatometric softening points in excess of 1000° C. These materials may be advantageously employed at high temperatures in direct combination with other materials of high expansion or may be used to join or hermetically seal components made of other materials having similarly high expansion.

There are a number of important technologies such as high temperature sensors (e.g. oxygen sensors); electro-chemical reactors utilising mixed ionic/electronic conducting ceramic membranes for oxygen generation, syngas production or gas to liquid (GTL) conversion; solid oxide fuel cells (SOFC), etc. which rely on the operation of functional ceramic materials at elevated temperatures, e.g. above ~700° C. In all of these cases, the functional materials are integrated into systems in which they are required to be rigidly bonded to other materials such as those which might be used for sealing, manifolding or supporting functions. In most cases, the various parts of the system will be required to be hermetically sealed, and the assembly should be able to be thermally cycled over large temperature ranges without loss of performance. In situations like this it is extremely important that there is a good match in thermal expansion coefficient between the different components of the system. If this is not the case there is a strong likelihood that one or several of the components will crack during thermal cycling, and that the efficiency of the unit will decrease due to gas leakage from one part of the system to another.

In other fields of application, there can be a need for hermetic, electrical feed-through seals which are able to operate at elevated temperature, e.g. for current leads in electrically driven oxygen generation devices where stabilised zirconia is used as the electrolyte, or in high temperature sensors. In these cases, it is necessary for the seal and the surrounding material to have expansion coefficients which are similar to or somewhat higher than that of the metallic feed-through material (depending on whether it is a matched or compressive feed-through seal). For high temperature operation, e.g. over 1000° C., particularly in atmospheres containing oxidising species, it is necessary to select a noble metal conductor such as platinum or a platinum alloy. In this case, the seal and surrounding materials will be required to have expansion coefficients in excess of $10 \times 10^{-6 \circ}$ C.$^{-1}$ (20–1000° C.) and have sufficient refractoriness to be able to operate for extended times at the desired temperature.

High expansion glass-ceramics are well known, particularly in the areas of glass-ceramic to metal feed-through seals and in oxidation resistant coatings on nickel based alloys.

In the case of hermetic glass-ceramic to metal feed-through seals, the sealing materials which are normally selected are based on alkali containing systems such as the Li$_2$O—ZnO—SiO$_2$ system described by McMillan & Partridge (U.S. Pat. No. 3,170,805). In systems such as these, the high alkali metal oxide content reduces the refractoriness of the glass-ceramic, so the maximum operating temperature of the feed-through seal is severely restricted.

There are many examples of glass-ceramics with high thermal expansion coefficient which have been developed as oxidation resistant coatings for metal alloy substrates. In one of these (U.S. Pat. No. 3,467,534) MacDowell describes a coated metal article where a range of barium silicate based glass-ceramics are used as coating materials. In these the BaO content lies in the range 20–70 wt %, and the SiO$_2$ content is between 30 and 80 wt %. The principal crystal phase in these coating materials is barium silicate. In another example (U.S. Pat. No. 5,250,360) Andrus & MacDowell disclose a range of glass-ceramic coatings based on either the BaO—SiO$_2$ or SrO—SiO$_2$ systems for protecting metal alloy substrates. These coating materials contain additives to enhance the flow characteristics during the coating process. These additives are selected from one or more of the following oxides Al$_2$O$_3$, ZrO$_2$, Y$_2$O$_3$, MnO, CoO, NiO, FeO and MgO. In another patent from Andrus & MacDowell (European Patent 0414458 A1) glass-ceramic coatings for oxidation protection of titanium aluminide substrates are disclosed. These are based on the alkaline-earth silicate systems, BaO—SiO$_2$, SrO—SiO$_2$ and CaO—SiO$_2$ or mixtures thereof. In the preferred compositions up to 35 wt % (MnO+FeO+MgO+ZrO$_2$+Al$_2$O$_3$) total additions are identified as being beneficial to coating performance.

The main object of the present invention was to arrive at glass-ceramic materials which have a combination of high thermal expansion coefficient and high temperature stability.

Another object of the present invention was to arrive at glass-ceramic materials which can be employed at high temperatures in direct combination with other materials of high expansion or may be used to join or hermetically seal components made of other materials having similarly high expansion.

The inventor has found that by processing certain glass raw materials according to a selected route, glass-ceramic materials having the above-mentioned properties can be obtained.

The materials according to the present invention are glass-ceramics from the BaO—La$_2$O$_3$—SiO$_2$ system which the inventor has found have the desired combination of high thermal expansion coefficient and high temperature stability.

The present invention will thus in its widest scope comprise glass-ceramic materials possessing high softening temperature (~1000° C. or above) and a thermal expansion coefficient in excess of $10 \times 10^{-6 \circ}$ C.$^{-1}$ (measured over the range 20–1000° C.), where said materials are prepared by controlled thermal treatment of precursor glass powders to a temperature in excess of 900° C., wherein said glass powders contain, on a weight percent basis, 10–55% BaO, 3–50% La$_2$O$_3$ and 25–48% SiO$_2$. Furthermore, the present invention will comprise a use of the glass-ceramic materials.

The glass-ceramic materials are prepared via a powder route, i.e. by the sintering and subsequent crystallisation of precursor glass powders of appropriate composition. Within the overall range of material compositions covered by the present invention, there is a significant variation in the rate of crystallisation such that the more slowly crystallising glasses may be considered for use as sealing or bonding materials, whereas those which crystallise most rapidly retain a significant degree of rigidity during the thermal treatment and could not be considered for such a purpose. Irrespective of the propensity of the material to deform or flow prior to crystallisation during thermal processing, the glass-ceramic produced will not soften or deform at temperatures below 1000° C. after heat-treatment. It will additionally have a coefficient of thermal expansion in excess of $10 \times 10^{-6 \circ}$ C.$^{-1}$ measured over the temperature range 20–1000° C.

Lanthanum oxide, which is found to be a beneficial and essential ingredient in the glass-ceramic materials according to the present invention, is not referred to in any of the afore-mentioned patent publications for high expansion, refractory glass-ceramics which are intended to provide an oxidation resistant coating on either metal alloy or titanium aluminide substrates. There are, however, a number of silicate based, inorganic coatings which have been disclosed in patents where lanthanum oxide is a necessary ingredient. For example in U.S. Pat. Nos. 4,746,578 and 4,839,313 (both Kondo et al.) glazes containing amongst other things 55–75 mol % $SiO_2$, 1–15 mol % $Al_2O_3$, 3–20 mol % CaO, 1–13 mol % BaO and between 0.5 and 5 mol % $La_2O_3$ are described. These have been developed as vitreous coatings for ceramic substrates, i.e. they are not intentionally devitrified, and consequently, they exhibit softening points which are significantly lower than those of the present invention. In addition to this, they have relatively low coefficients of thermal expansion (below $8 \times 10^{-6 \circ}$ C.$^{-1}$). In an earlier disclosure (U.S. Pat. No. 3,501,322), Dumbaugh & Malmendier describe a range of glass compositions in the BaO—$Al_2O_3$—$La_2O_3$—$SiO_2$ system for glazing of high alumina ceramic substrates wherein the glaze materials contain between 2.5 and 10 mol % lanthanum oxide. These glazes also had relatively low coefficients of thermal expansion, and were not particularly refractory because they were not subjected to a devitrifying thermal treatment.

The inclusion of lanthanum oxide in refractory, aluminosilicate based glass-ceramics is referred to by MacDowell & Frasier in DE 1496090. In this case it is considered to be one of the many oxides which can be used for reducing the tendency of the glass melt to devitrify during cooling. Although the glass-ceramics referred to by MacDowell & Frasier in DE 1496090 were extremely refractory and could be used at temperatures as high as 1400° C., they were of relatively low expansion because the predominant crystal phase developed during heat-treatment was mullite. As such, these materials could not be employed in the same application areas as the glass-ceramics of the present invention since a high thermal expansion is an essential requirement.

The lanthanum oxide, which is an essential component of the materials of the present invention, serves a dual function. At small levels of addition, e.g. 3–10 wt %, it retards the crystallisation process and therefore improves the sintering (and flow) characteristics of the precursor glass powders during thermal processing. However, unlike other crystallisation inhibitors which are more commonly used in alkaline-earth silicate based glass-ceramics, such as $Al_2O_3$, $Y_2O_3$ and $ZrO_2$, it does not lead to a significant decrease in the thermal expansion coefficient of the material after heat-treatment due to the development of crystalline phases of low thermal expansion. A common problem with the addition of alternative crystallisation retardants such as MnO, NiO, FeO and MgO to alkaline earth silicate based materials, is that there is a significant decrease in refractoriness. This is also largely avoided when small additions of lanthanum oxide are used to retard crystallisation.

When larger amounts of lanthanum oxide are used, i.e. over 10 wt %, lanthanum silicate $La_2Si_2O_7$ forms as one of the main crystalline phases in the glass-ceramic. This lanthanum silicate is extremely refractory, with a melting point in the region of 1750° C. As such it contributes to the overall performance of these glass-ceramics in terms of excellent high temperature stability.

The glass-ceramics according to the present invention are substantially free (<1 wt %) from alkali metal oxides and boron oxide such that the refractoriness of the glass-ceramic materials is not compromised. The glass-ceramics may contain only limited amounts (<5 wt %) of aluminium oxide as this latter ingredient is known to lower the coefficient of thermal expansion of the glass-ceramic significantly.

The first stage in the production of the materials according to the present invention is the melting of the precursor glasses. For this, suitable raw materials such as metal oxides and carbonates are thoroughly mixed in the appropriate proportions to form the glass batch, and this is melted at a temperature of between 1400° C. and ~1700° C. Once a sufficient degree of homogeneity has been achieved in the glass melt, the material is cooled to form a solid glass which can be processed further. The solid glass is then mechanically broken down to form a powder of suitable particle size distribution.

The glass powder is then shaped, preferably but not necessarily with the help of added processing aids, using well established ceramic powder processing means such as slip casting, isostatic pressing, etc. In the case where the material is to be used directly as a sealing or bonding material, it is applied to the surface(s) to be joined, or alternatively placed directly in the joint gap. The powder compact is then subjected to a heat-treatment in one or more stages, such that in the course of the entire thermal treatment, it is exposed to a temperature of at least 900° C., or preferably higher, whereby it is converted to a substantially crystalline material with a combination of high thermal expansion coefficient and excellent refractoriness. The heating rate used during the course of the thermal treatment should be compatible with the size and complexity of the components, or assemblies of components being heat-treated. For example, if large or thick-walled green-bodies are being heat-treated, or if large components are being sealed or bonded together, particularly components which are made of high expansion ceramic materials, then the maximum heating rate used during thermal processing should be controlled to avoid any likelihood of fracture due to excessive temperature gradients.

The invention will be further explained and elucidated in the following example and figures.

EXAMPLE

Figure 1:
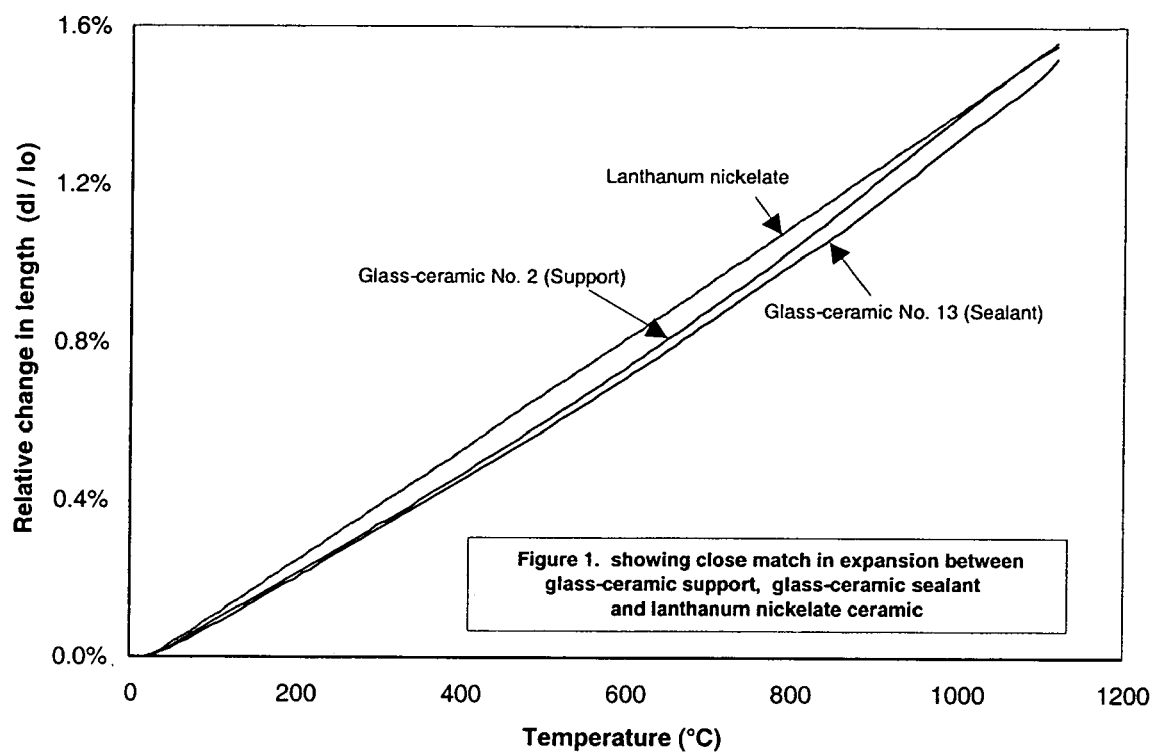
FIG. 1 shows the close match in expansion between glass-ceramic support, glass-ceramic sealant and lanthanum nickelate ceramic.

By way of illustration, a number of different glass-ceramic compositions are given in Table 1 below. In Table 1, the deformation characteristics of the different materials are given to provide an indication of whether the glass-ceramics are suitable for use as sealing or bonding materials. The flow behaviour has been characterised by measuring the total linear deformation (axial) during heating of a cylindrical powder compact at a rate of 12° C./minute under a very small axial stress (0.1 kPa). Experience has shown that materials exhibiting axial deformations of less than ~40% in this particular test are not suitable for use in bonding or sealing applications. Those exhibiting axial deformations in excess of 60%, however, can readily be employed as bonds or sealants under a wide range of thermal processing conditions. Those materials which have axial deformations in the range 40–60% can be used for bonding or sealing, but under a more limited range of heat-treatment conditions.

The thermal expansion coefficients of the glass-ceramics were measured on 40–50 mm long samples which had been heat-treated at a temperature in the range 1100–1200° C. The expansion characteristics were determined during heating at a rate of 6° C./minute to a temperature in excess of 1100° C.

perature of 1250° C. to effect sintering/crystallisation. After holding at 1250° C. for 2 hours, the sample was cooled at 6° C./minute to 700° C. and then furnace cooled to room temperature. One of the flat surfaces of the disc was ground in preparation for bonding to the lanthanum nickelate.

A free-flowing paste was made up by mixing glass powder No. 13 with an organic liquid carrier (pentyl acetate) containing 2 wt % polyacrylic binder (Acryloid B-72). A thin layer of this glass powder paste was applied to the surfaces of the glass-ceramic support and the lanthanum nickelate disc which were to be bonded, and allowed to dry.

TABLE 1

Composition and properties of glass-ceramics produced in the $BaO-La_2O_3-SiO_2$ system

| Glass Ref | BaO wt % | $La_2O_3$ wt % | $SiO_2$ wt % | Other wt % | | Heat-treatment (° C./hrs) | $CTE_{20-1000° C.}$ (*) $(10^{-6} C^{-1})$ | Dilatometric softening point (° C.) | Total axial deformation during heating at 12° C./min with 0.1 kPa axial load |
|---|---|---|---|---|---|---|---|---|---|
| 1 | 38.77 | 24.71 | 36.52 | | | 1100/1 | 13.4 | >1150 | 55% |
| 2 | 49.63 | 22.60 | 27.78 | | | 1200/2 | 14.0 | 1180 | 16% |
| 3 | 29.36 | 39.00 | 31.64 | | | 1100/1 | 12.8 | 1150 | 42% |
| 4 | 24.31 | 34.42 | 41.27 | | | 1100/1 | 13.5 | >1125 | 16% |
| 5 | 39.65 | 16.85 | 43.50 | | | 1100/1 | 13.4 | 1150 | 50% |
| 6 | 29.85 | 34.16 | 35.99 | | | 1100/1 | 13.0 | 1160 | 36% |
| 7 | 35.26 | 32.79 | 31.95 | | | 1100/1 | 12.8 | 1150 | 35% |
| 8 | 45.24 | 20.24 | 34.52 | | | 1100/1 | 13.6 | 1130 | 26% |
| 9 | 38.08 | 24.24 | 35.82 | 1.91 | $Al_2O_3$ | 1100/1 | 12.0 | >1125 | 73% |
| 10 | 37.17 | 23.69 | 35.01 | 4.14 | $Y_2O_3$ | 1100/1 | 12.7 | >1125 | 65% |
| 11 | 38.57 | 24.58 | 36.32 | 0.53 | CaO | 1100/1 | 13.5 | 1140 | 62% |
| 12 | 37.67 | 24.01 | 35.48 | 2.83 | NiO | 1100/1 | 13.3 | 1125 | 68% |
| 13 | 37.26 | 23.76 | 35.09 | 3.89 | SrO | 1100/1 | 13.5 | >1130 | 61% |
| 14 | 50.49 | 15.46 | 31.02 | 3.03 | ZnO | 1100/1 | 12.7 | 1125 | 29% |
| 15 | 50.11 | 7.10 | 39.27 | 3.51 | MgO | 1100/1 | 14.8 | 1110 | 41% |
| 16 | 42.81 | 7.43 | 41.90 | 7.68 | CaO | 1100/1 | 12.7 | 1130 | 52% |
| 17 | 18.88 | 9.02 | 44.40 | 27.7 | CaO | 1100/1 | 11.5 | >1125 | 86% |
| 18 | 38.12 | 19.84 | 37.32 | 4.72 | CaO | 1100/1 | 11.4 | 1190 | 68% |
| 19 | 39.36 | 3.75 | 37.70 | 19.18 | NiO | 1150/10 | 13.4 | >1125 | 72% |
| 20 | 24.88 | 26.43 | 36.56 | 12.12 | NiO | 1100/1 | 12.7 | 1120 | 92% |
| 21 | 18.81 | 36.89 | 35.14 | 9.16 | NiO | 1100/1 | 11.8 | 1125 | 62% |
| 22 | 13.52 | 45.97 | 33.91 | 6.59 | NiO | 1100/1 | 10.4 | 1125 | 36% |
| 23 | 22.16 | 38.26 | 34.19 | 5.40 | NiO | 1100/1 | 11.4 | 1125 | 55% |
| 24 | 28.53 | 30.31 | 30.74 | 10.42 | NiO | 1100/1 | 12.6 | 1130 | 47% |
| 25 | 34.73 | 7.53 | 40.82 | 16.92 | NiO | 1100/1 | 12.7 | 1125 | 85% |
| 26 | 33.99 | 14.02 | 35.43 | 16.56 | NiO | 1100/1 | 12.8 | 1130 | 90% |
| 27 | 34.64 | 3.87 | 39.29 | 22.20 | NiO | 1100/1 | 13.2 | 1130 | 70% |
| 28 | 32.20 | 14.25 | 37.85 | 15.69 | NiO | 1100/1 | 13.1 | 1110 | 95% |
| 29 | 32.34 | 25.30 | 37.39 | 4.97 | SrO | 1100/1 | 13.5 | 1140 | 71% |

(*) Coefficient of Thermal Expansion (CTE) measured over the range 20° C. to 1000° C.

As an example of how these materials may be employed in one particular field of application, one material with good flow characteristics was used to seal a 10 mm diameter, 2 mm thick disc of lanthanum nickelate, $La_2NiO_4$ ($CTE_{20-1000° C.} \simeq 14 \times 10^{-6°} C.^{-1}$) on to a 5 mm thick support of another glass-ceramic material. Lanthanum nickelate was used, as this mixed ionic/electronic conducting ceramic is of interest as an oxygen-selective membrane material in high temperature, electro-chemical reactors. The glass-ceramics which were chosen as the seal and support materials (Nos. 13 and 2, respectively, Table 1) were selected on the basis of their excellent expansion match with lanthanum nickelate (FIG. 1).

Figure 2:
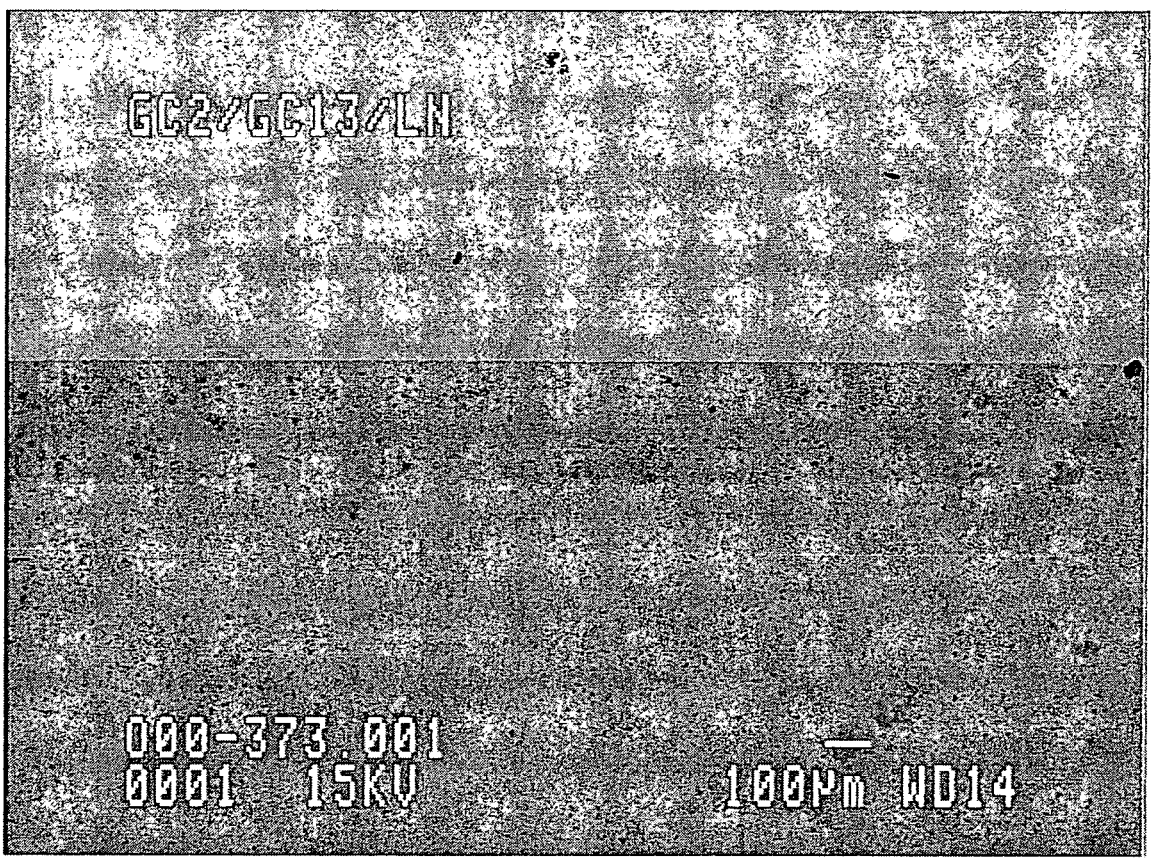
FIG. 2 shows a back-scattered electron image of a polished section of a crack-free joint made between glass-ceramic support (bottom) and lanthanum nickelate (top) using glass-ceramic sealant. The support material is glass-ceramic No. 2 and the sealant is glass-ceramic No. 13 (as defined in Table 1).

The glass-ceramic support was produced by pressing a 13 mm diameter disc of glass powder No. 2 containing 1 wt % polyacrylic binder (Acryloid B-72, Rohm & Haas, Philadelphia) to 30 MPa in a uniaxial die. The pressed body was then heated slowly in air to 450° C. in order to remove the organic binder, and subsequently heated at 6° C./minute to a tem- The two halves of the joint were then assembled and transferred to a heat-treatment furnace. A small load of approximately 200 g was placed on the assembled joint in order to facilitate the development of a sound bond during thermal treatment. The assembly was then heated at 2° C./minute to 450° C. in air in order to burn-off the acrylic binder, and then heated at 5° C./minute to 1100° C., also in air, to allow bond formation. The samples were held at 1100° C. for 1 hour prior to cooling at 5° C./minute to room temperature. The bond was sectioned, polished and examined in a scanning electron microscope (SEM) using the backscattered electron mode to assess joint quality. A cross-section of the joint, FIG. 2, shows that excellent bonding has been achieved between the different materials, and the absence of cracks demonstrates the good match in expansion characteristics between the two glass-ceramics and the lanthanum nickelate.

Whilst the example given above has been limited to one particular field of application, this is clearly not the only field in which these materials can be applied. With a combination of high thermal expansion coefficient and excellent high temperature stability, there are many other potential fields of application where these glass-ceramics could be advantageously employed, such as structural components or gas manifolds in high temperature electro-chemical reactors, or as the insulating/sealing components in systems requiring hermetic, electrical feed-through seals which can operate at elevated temperatures.

The invention claimed is:

1. A process for manufacturing glass-ceramic materials in the $BaO$—$La_2O_3$—$SiO_2$ system that possess a softening temperature above 1000° C. and a thermal expansion coefficient in excess of $10 \times 10^{-6}$° $C.^{-1}$ when measured over the range 20–1000° C., comprising
    manufacturing said materials by thermal treatment of a precursor glass powder at a temperature in excess of 900° C. and converting said powder to a substantially crystalline glass ceramic material wherein said powder comprises, on a weight percent basis, 10–55% $BaO$, 3–50% $La_2O_3$–25–48% $SiO_2$, less than 5% $Al_2O_3$ and less than 1% $B_2O_3$.

2. The process according to claim 1, whereby the total content of alkali metal oxides in said precursor glass powder is less than 1% by weight.

* * * * *